(12) United States Patent
Baxendale et al.

(10) Patent No.: US 11,473,544 B2
(45) Date of Patent: Oct. 18, 2022

(54) METHODS AND SYSTEM FOR STARTING AN ENGINE

(71) Applicant: Ford Global Technologies, LLC, Dearborn, MI (US)

(72) Inventors: Timothy Baxendale, Royal Oak, MI (US); Thomas Ciccone, West Bloomfield, MI (US); Corey Blue, Belleville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 124 days.

(21) Appl. No.: 17/142,008

(22) Filed: Jan. 5, 2021

(65) Prior Publication Data

US 2022/0213856 A1     Jul. 7, 2022

(51) Int. Cl.
| | | |
|---|---|---|
| *F02N 11/00* | (2006.01) | |
| *F02N 11/08* | (2006.01) | |
| *B60W 20/40* | (2016.01) | |
| *B60W 10/06* | (2006.01) | |
| *B60W 10/08* | (2006.01) | |

(52) U.S. Cl.
CPC ......... *F02N 11/0851* (2013.01); *B60W 10/06* (2013.01); *B60W 10/08* (2013.01); *B60W 20/40* (2013.01); *B60W 2510/0638* (2013.01); *B60W 2510/081* (2013.01); *B60W 2710/0644* (2013.01); *B60W 2710/083* (2013.01); *F02N 2200/022* (2013.01); *F02N 2200/041* (2013.01); *F02N 2200/0802* (2013.01); *F02N 2300/102* (2013.01)

(58) Field of Classification Search
CPC ...... B60W 10/02; B60W 10/06; B60W 10/08; B60W 20/40; B60W 2510/0638; B60W 2510/081; B60W 2710/0644; B60W 2710/083; F02N 11/0851; F02N 2200/022; F02N 2200/041; F02N 2200/0802; F02N 2300/102
See application file for complete search history.

(56) References Cited

U.S. PATENT DOCUMENTS

| | | | |
|---|---|---|---|
| 9,150,219 B2 | 10/2015 | Wang et al. | |
| 9,656,666 B2 | 5/2017 | Wang et al. | |
| 9,821,798 B2 | 11/2017 | Wang et al. | |
| 9,937,919 B2 * | 4/2018 | Zhang | B60K 6/26 |
| 10,071,653 B2 | 9/2018 | Meyer et al. | |
| 10,640,106 B2 | 5/2020 | Meyer et al. | |
| 2013/0296108 A1 * | 11/2013 | Ortmann | B60K 6/48 903/902 |
| 2017/0291597 A1 * | 10/2017 | Hata | B60W 10/08 |
| 2018/0050609 A1 * | 2/2018 | Meyer | B60L 50/61 |
| 2019/0040831 A1 * | 2/2019 | Yamamoto | F02N 11/0866 |

FOREIGN PATENT DOCUMENTS

JP     5391654 B2     1/2014

* cited by examiner

*Primary Examiner* — Edwin A Young
(74) *Attorney, Agent, or Firm* — David Kelley; McCoy Russell LLP (57) ABSTRACT

Systems and methods for operating various components of a hybrid driveline during starting of an internal combustion engine are described. In one example, output of an electric machine is not adjusted during engine starting when a speed of the electric machine exceeds a threshold speed so that torque reporting is accurate and to ensure combustion is reliable.

20 Claims, 7 Drawing Sheets

METHODS AND SYSTEM FOR STARTING AN ENGINE

FIELD

The present description relates to methods and a system for improving starting of an engine of a hybrid vehicle.

BACKGROUND AND SUMMARY

An engine of a hybrid vehicle may need to be started from time to time when the hybrid vehicle is being operated. The engine may be started to provide propulsive effort to the hybrid vehicle's driveline, to charge a battery, or to heat an emissions control device. The engine may be started when the engine is cold, when the engine is hot, when ambient temperature is hot or cold, and when the hybrid vehicle is moving or stationary. It may be desirable to provide as consistent as possible engine starting during all of these engine conditions to control engine emissions and improve owner satisfaction.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

Figure 6:
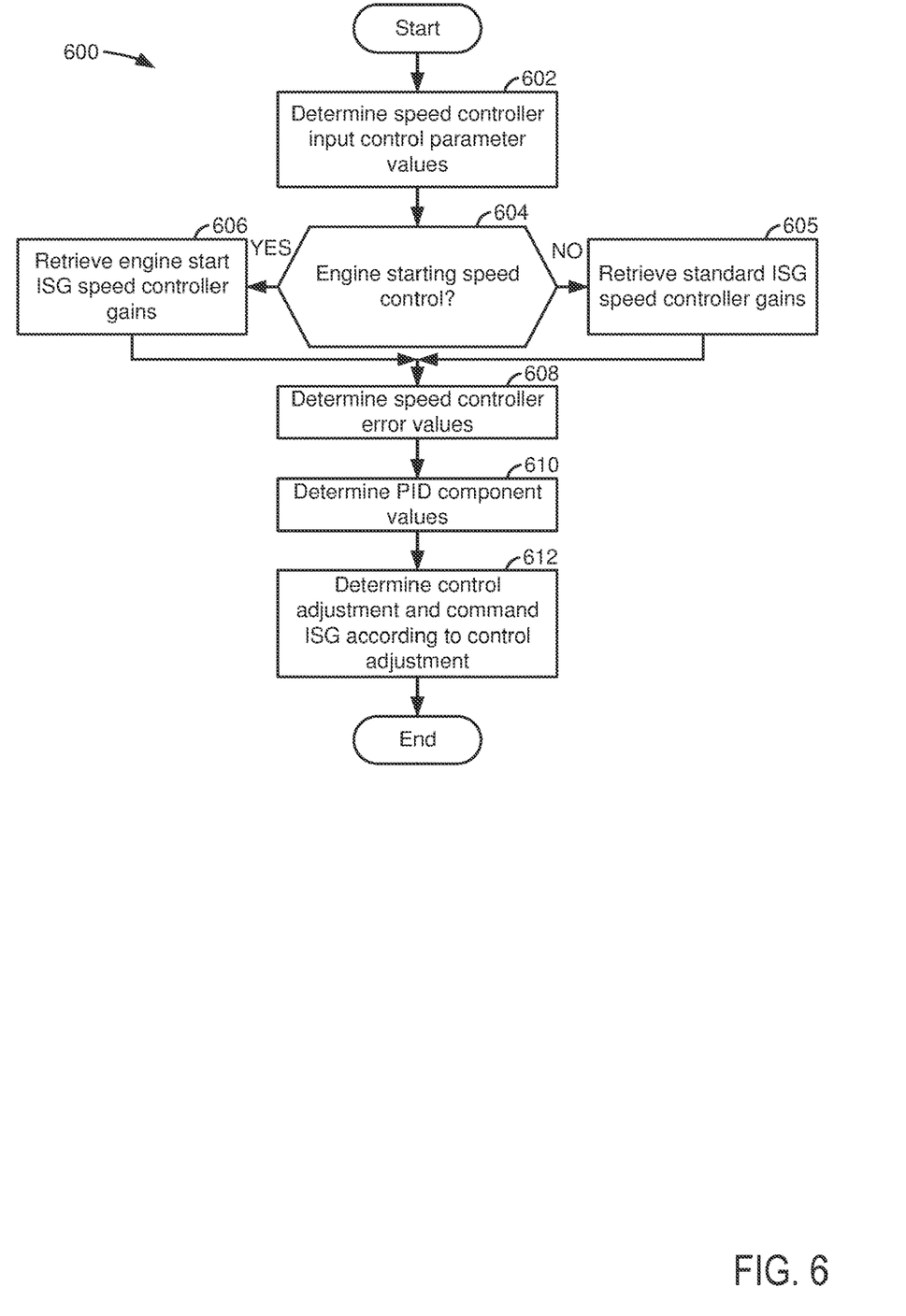
FIG. 6 shows a flow chart of an engine speed controller.
Figure 7:
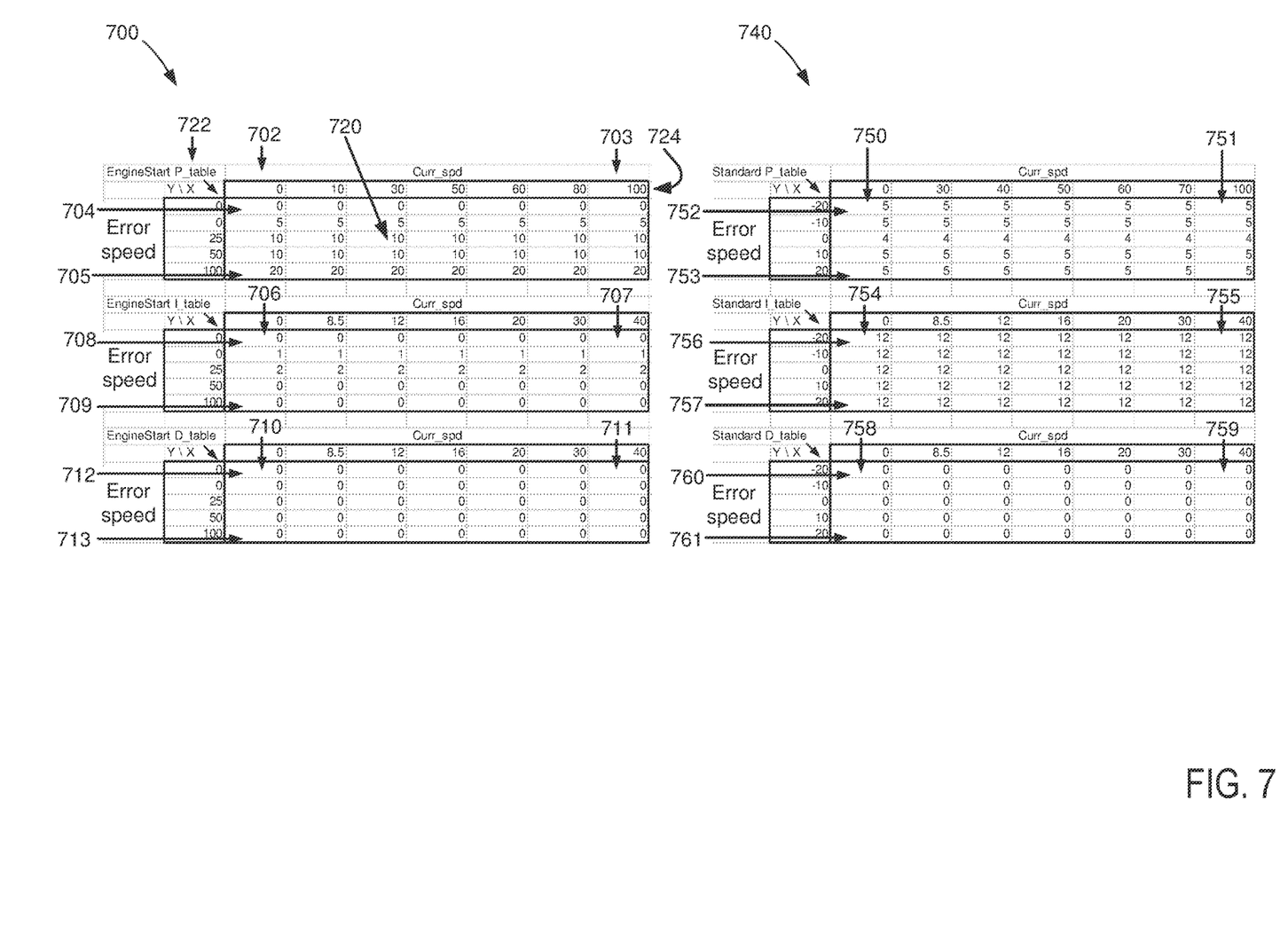
FIG. 7 shows example gain values for the engine speed controller of FIG. 6.

The present description is related to starting an engine of a hybrid vehicle. The engine may be of the type shown in FIG. 1. Alternatively, the engine may be a diesel engine. The engine may be incorporated into a hybrid vehicle driveline as shown in FIG. 2. The engine may be started according to the sequence shown in FIG. 3. In addition, the engine may be started according to the method shown in FIGS. 4 and 5. The method of FIGS. 4 and 5 may include a speed controller as shown in FIG. 6. The speed controller may reference and apply speed controller gain values as shown in FIG. 7.

An engine of a hybrid vehicle may be started via an integrated starter generator (ISG). The ISG may rotate the engine without providing propulsive effort to the hybrid vehicle's driveline. Alternatively, the ISG may rotate the engine while providing propulsive effort to the hybrid vehicle's driveline at a same time. However, it may be challenging to close the driveline disconnect clutch at a prescribed time and with a proper amount of torque capacity during engine starting so that the possibility of driveline torque disturbances may be reduced. In addition, the speed of the engine may vary from engine start to engine start making it more difficult to control engine emissions. Therefore, it may be desirable to provide a way of consistently starting an engine of a hybrid vehicle.

The inventors herein have recognized the above-mentioned issues and have developed a method for starting an engine, comprising: operating an electric machine in a speed control mode to achieve a first requested speed in response to a request to start an engine; closing a driveline disconnect clutch to couple the engine to the electric machine in response to the request to start the engine; and reducing a speed of the electric machine to a second requested speed in response to a line pressure of a transmission reaching a threshold pressure and a speed of the engine increasing.

By operating an electric machine in a speed control mode to achieve a first requested speed and reducing the speed of the electric machine to a second speed in response to transmission line pressure and speed of an engine increasing, it may be possible to provide the technical result of improving driveline disconnect clutch operation and reducing engine speed changes from engine start to engine start so that engine emissions and owner satisfaction may be improved. In particular, speed of the electric machine may be initially adjusted to a higher level so that a torque capacity of a disconnect clutch may be reliably controlled. In addition, the speed of the electric machine may be adjusted to a lower speed thereafter to crank the engine, which may reduce engine starting disturbances within a vehicle cabin and mimic engine starting via a 12 volt starter.

The present description may provide several advantages. In particular, the approach may improve engine speed control during engine starting. Further, the approach may improve torque control of a disconnect clutch when the disconnect clutch is used to transfer torque from an electric machine to start the engine. In addition, the approach avoids different speed controllers working against each other during engine starting so that engine starts may be more repeatable.

The above advantages and other advantages, and features of the present description will be readily apparent from the following Detailed Description when taken alone or in connection with the accompanying drawings.

Figure 1:
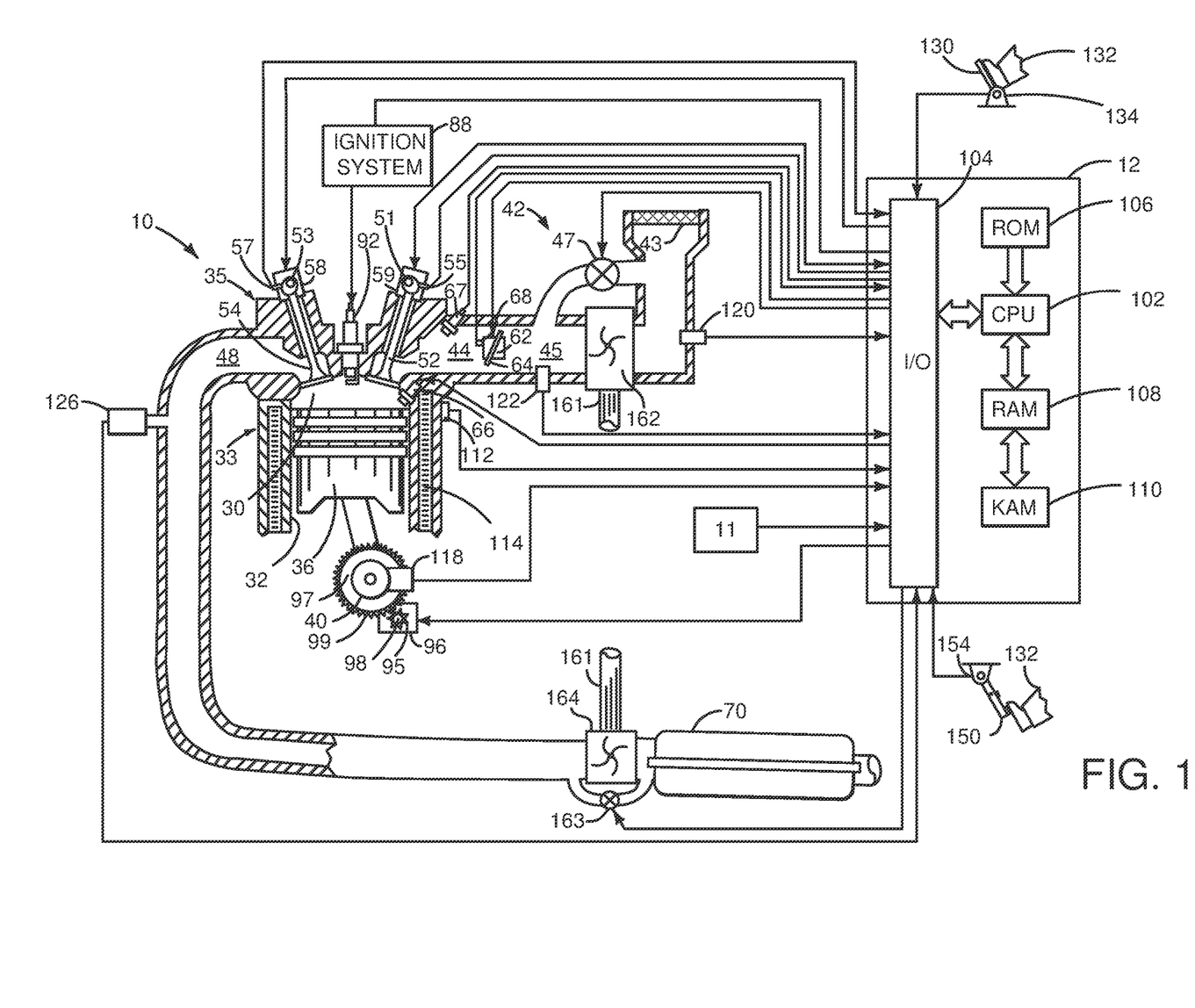
FIG. 1 is a schematic diagram of an engine.
Figure 2:
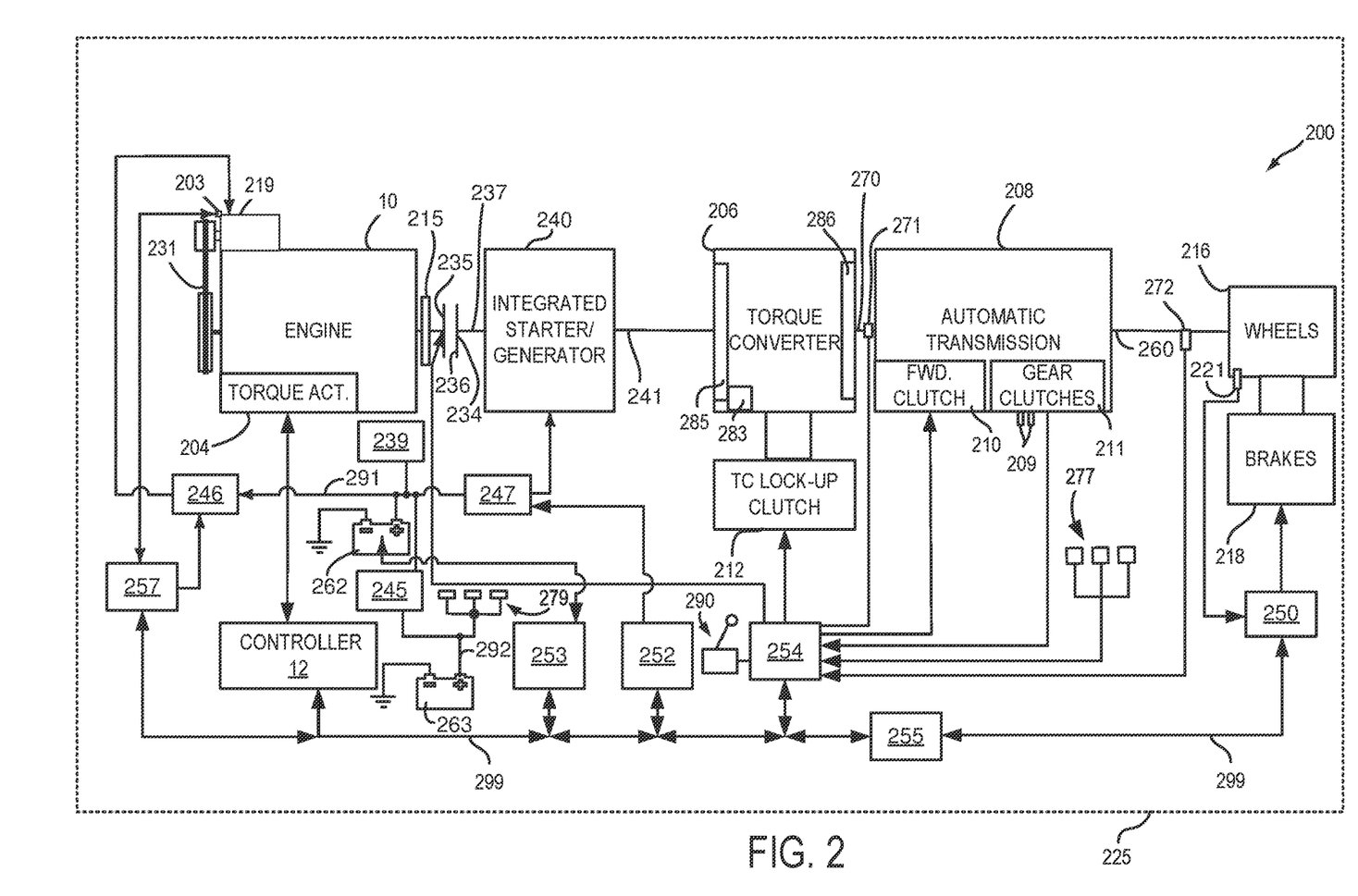
FIG. 2 is a schematic diagram of a vehicle driveline.

Referring to FIG. 1, internal combustion engine 10, comprising a plurality of cylinders, one cylinder of which is shown in FIG. 1, is controlled by electronic engine controller 12. The controller 12 receives signals from the various sensors shown in FIGS. 1 and 2. The controller employs the actuators shown in FIGS. 1 and 2 to adjust engine and driveline or powertrain operation based on the received signals and instructions stored in memory of controller 12.

Engine 10 is comprised of cylinder head 35 and block 33, which include combustion chamber 30 and cylinder walls 32. Piston 36 is positioned therein and reciprocates via a connection to crankshaft 40. Flywheel 97 and ring gear 99 are coupled to crankshaft 40. Optional starter 96 (e.g., low voltage (operated with less than 30 volts) electric machine) includes pinion shaft 98 and pinion gear 95. Pinion shaft 98 may selectively advance pinion gear 95 to engage ring gear 99. Optional starter 96 may be directly mounted to the front of the engine or the rear of the engine. In some examples, starter 96 may selectively supply power to crankshaft 40 via a belt or chain. In addition, starter 96 is in a base state when not engaged to the engine crankshaft 40 and flywheel ring gear 99.

Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57. Intake valve 52 may be selectively activated and deactivated by valve activation device 59. Exhaust valve 54 may be selectively activated and deactivated by valve activation device 58. Valve activation devices 58 and 59 may be electro-mechanical devices.

Direct fuel injector 66 is shown positioned to inject fuel directly into cylinder 30, which is known to those skilled in the art as direct injection. Port fuel injector 67 is shown positioned to inject fuel into the intake port of cylinder 30, which is known to those skilled in the art as port injection. Fuel injectors 66 and 67 deliver liquid fuel in proportion to pulse widths provided by controller 12. Fuel is delivered to fuel injectors 66 and 67 by a fuel system (not shown) including a fuel tank, fuel pump, and fuel rail (not shown).

In addition, intake manifold 44 is shown communicating with turbocharger compressor 162 and engine air intake 42. In other examples, compressor 162 may be a supercharger compressor. Shaft 161 mechanically couples turbocharger turbine 164 to turbocharger compressor 162. Optional electronic throttle 62 adjusts a position of throttle plate 64 to control air flow from compressor 162 to intake manifold 44. Pressure in boost chamber 45 may be referred to a throttle inlet pressure since the inlet of throttle 62 is within boost chamber 45. The throttle outlet is in intake manifold 44. In some examples, throttle 62 and throttle plate 64 may be positioned between intake valve 52 and intake manifold 44 such that throttle 62 is a port throttle. Compressor recirculation valve 47 may be selectively adjusted to a plurality of positions between fully open and fully closed. Waste gate 163 may be adjusted via controller 12 to allow exhaust gases to selectively bypass turbine 164 to control the speed of compressor 162. Air filter 43 cleans air entering engine air intake 42.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of three-way catalyst 70. Alternatively, a two-state exhaust gas oxygen sensor may be substituted for UEGO sensor 126.

Catalyst 70 may include multiple bricks and a three-way catalyst coating, in one example. In another example, multiple emission control devices, each with multiple bricks, can be used.

Controller 12 is shown in FIG. 1 as a conventional microcomputer including: microprocessor unit 102, input/output ports 104, read-only memory 106 (e.g., non-transitory memory), random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to a propulsive effort pedal 130 (e.g., a human/machine interface) for sensing force applied by human driver 132; a position sensor 154 coupled to brake pedal 150 (e.g., a human/machine interface) for sensing force applied by human driver 132, a measurement of engine manifold pressure (MAP) from pressure sensor 122 coupled to intake manifold 44; an engine position sensor from a Hall effect sensor 118 sensing crankshaft 40 position; a measurement of air mass entering the engine from sensor 120; and a measurement of throttle position from sensor 68. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

Controller 12 may also receive input from human/machine interface 11. A request to start or stop the engine or vehicle may be generated via a human and input to the human/machine interface 11. The human/machine interface 11 may be a touch screen display, pushbutton, key switch or other known device.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC).

During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion.

During the expansion stroke, the expanding gases push piston 36 back to BDC. Crankshaft 40 converts piston movement into a rotational power of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

FIG. 2 is a block diagram of a vehicle 225 including a powertrain or driveline 200. The powertrain of FIG. 2 includes engine 10 shown in FIG. 1. Powertrain 200 is shown including vehicle system controller 255, engine controller 12, first electric machine controller 252, second electric machine controller 257, transmission controller 254, energy storage device controller 253, and brake controller 250. The controllers may communicate over controller area network (CAN) 299. Each of the controllers may provide information to other controllers such as power output limits (e.g., power output of the device or component being controlled not to be exceeded), power input limits (e.g., power input of the device or component being controlled not to be exceeded), power output of the device being controlled, sensor and actuator data, diagnostic information (e.g., information regarding a degraded transmission, information regarding a degraded engine, information regarding a degraded electric machine, information regarding degraded brakes), etc. Further, the vehicle system controller 255 may provide commands to engine controller 12, electric machine controller 252, transmission controller 254, and brake controller 250 to achieve driver input requests and other requests that are based on vehicle operating conditions.

For example, in response to a driver releasing a propulsive effort pedal and vehicle speed, vehicle system controller 255 may request a desired wheel power or a wheel power level to provide a desired rate of vehicle speed reduction. The requested desired wheel power may be provided by vehicle system controller 255 requesting a first braking power from electric machine controller 252 and a second braking power from engine controller 12, the first and second powers providing a desired driveline braking power at vehicle wheels 216. Vehicle system controller 255 may also request a friction braking power via brake controller 250. The braking powers may be referred to as negative powers since they slow driveline and wheel rotation. Positive power may maintain or increase speed of the driveline and wheel rotation.

In other examples, the partitioning of controlling powertrain devices may be partitioned differently than is shown in FIG. 2. For example, a single controller may take the place of vehicle system controller 255, engine controller 12, first electric machine controller 252, second electric machine controller 257, transmission controller 254, and brake controller 250. Alternatively, the vehicle system controller 255 and the engine controller 12 may be a single unit while the electric machine controller 252, the transmission controller 254, and the brake controller 250 are standalone controllers.

In this example, propulsive effort may be provided to powertrain 200 by engine 10, BISG 219, and electric machine 240. In other examples, engine 10 may be omitted. Engine 10 may be started with an engine starting system shown in FIG. 1, via BISG 219, or via driveline integrated starter/generator (ISG) 240 also known as an integrated starter/generator. A speed of BISG 219 may be determined via optional BISG speed sensor 203. Driveline ISG 240 (e.g., high voltage (operated with greater than 30 volts) electrical machine) may also be referred to as an electric machine, motor, and/or generator. Further, power of engine 10 may be adjusted via power actuator 204, such as a fuel injector, throttle, etc.

Driveline 200 is shown to include a belt integrated starter/generator (ISG) 219. ISG 219 may be coupled to crankshaft 40 of engine 10 via a belt 231. Alternatively, ISG 219 may be directly coupled to crankshaft 40. ISG 219 may provide a negative torque to driveline 200 when charging higher voltage electric energy storage device 262 (e.g., a traction battery). ISG 219 may also provide a positive torque to rotate driveline 200 via energy supplied by lower voltage electric energy storage device (e.g., a battery or capacitor) 263. In one example, electric energy storage device 262 may output a higher voltage (e.g., 48 volts) than electric energy storage device 263 (e.g., 12 volts). DC/DC converter 245 may allow exchange of electrical energy between high voltage (e.g., >24 volts) electric power distribution bus 291 and low voltage (e.g., <24 volts) electric power distribution bus 292. High voltage electric power distribution bus 291 is electrically coupled to inverter 246 and traction battery or electric energy storage device 262. High voltage electric power distribution bus 291 may be comprised of metallic bus bars (e.g., copper or aluminum bars) and terminals that allow connection to the high voltage electric power distribution bus 291.

Low voltage electric power distribution bus 292 is electrically coupled to lower voltage electric energy storage device 263 and sensors/actuators/accessories 279. Electrical accessories 279 may include but are not limited to front and rear windshield resistive heaters, vacuum pumps, climate control fans, and lights. Inverter 246 converts DC power to AC power and vice-versa to enable power to be transferred between ISG 219 and electric energy storage device 262. Likewise, inverter 247 converts DC power to AC power and vice-versa to enable power to be transferred between ISG 240 and electric energy storage device 262.

An engine output power may be transmitted to an input or first side of powertrain disconnect clutch 235 through dual mass flywheel 215. Disconnect clutch 236 may be electrically or hydraulically actuated. The downstream or second side 234 of disconnect clutch 236 is shown mechanically coupled to ISG input shaft 237.

ISG 240 may be operated to provide power to powertrain 200 or to convert powertrain power into electrical energy to be stored in electric energy storage device 262 in a regeneration mode. ISG 240 is in electrical communication with energy storage device 262. ISG 240 has a higher output power capacity than starter 96 shown in FIG. 1 or BISG 219. Further, ISG 240 directly drives powertrain 200 or is directly driven by powertrain 200. There are no belts, gears, or chains to couple ISG 240 to powertrain 200. Rather, ISG 240 rotates at the same rate as powertrain 200. Electrical energy storage device 262 (e.g., high voltage battery or power source) may be a battery, capacitor, or inductor. The downstream side of ISG 240 is mechanically coupled to the impeller 285 of torque converter 206 via shaft 241. The upstream side of the ISG 240 is mechanically coupled to the disconnect clutch 236. ISG 240 may provide a positive power or a negative power to powertrain 200 via operating as a motor or generator as instructed by electric machine controller 252.

Torque converter 206 includes a turbine 286 to output power to input shaft 270. Input shaft 270 mechanically couples torque converter 206 to automatic transmission 208. Torque converter 206 also includes a torque converter bypass lock-up clutch 212 (TCC). Power is directly transferred from impeller 285 to turbine 286 when TCC is locked. TCC is electrically operated by controller 254. Alternatively, TCC may be hydraulically locked. In one example, the torque converter may be referred to as a component of the transmission.

When torque converter lock-up clutch 212 is fully disengaged, torque converter 206 transmits engine power to automatic transmission 208 via fluid transfer between the torque converter turbine 286 and torque converter impeller 285, thereby enabling torque multiplication. In contrast, when torque converter lock-up clutch 212 is fully engaged, the engine output power is directly transferred via the torque converter clutch to an input shaft 270 of transmission 208. Alternatively, the torque converter lock-up clutch 212 may be partially engaged, thereby enabling the amount of power directly transferred to the transmission to be adjusted. The transmission controller 254 may be configured to adjust the amount of power transmitted by torque converter 212 by adjusting the torque converter lock-up clutch in response to various engine operating conditions, or based on a driver-based engine operation request.

Torque converter 206 also includes pump 283 that pressurizes fluid to operate disconnect clutch 236, forward clutch 210, and gear clutches 211. Pump 283 is driven via impeller 285, which rotates at a same speed as ISG 240.

Automatic transmission 208 includes gear clutches (e.g., gears 1-10) 211 and forward clutch 210. Automatic transmission 208 is a fixed ratio transmission. Alternatively, transmission 208 may be a continuously variable transmission that has a capability of simulating a fixed gear ratio transmission and fixed gear ratios. The gear clutches 211 and the forward clutch 210 may be selectively engaged to change a ratio of an actual total number of turns of input shaft 270 to an actual total number of turns of wheels 216. Gear clutches 211 may be engaged or disengaged via adjusting fluid supplied to the clutches via shift control solenoid valves 209. Power output from the automatic transmission 208 may also be relayed to wheels 216 to propel the vehicle via output shaft 260. Specifically, automatic transmission 208 may transfer an input driving power at the input shaft 270 responsive to a vehicle traveling condition before transmitting an output driving power to the wheels 216. Transmission controller 254 selectively activates or engages TCC 212, gear clutches 211, and forward clutch 210. Transmission controller also selectively deactivates or disengages TCC 212, gear clutches 211, and forward clutch 210.

Further, a frictional force may be applied to wheels 216 by engaging friction wheel brakes 218. In one example, friction wheel brakes 218 may be engaged in response to a human driver pressing their foot on a brake pedal (not shown) and/or in response to instructions within brake controller 250. Further, brake controller 250 may apply brakes 218 in response to information and/or requests made by vehicle system controller 255. In the same way, a frictional force may be reduced to wheels 216 by disengaging wheel brakes 218 in response to the human driver releasing their foot from a brake pedal, brake controller instructions, and/or vehicle system controller instructions and/or information. For example, vehicle brakes may apply a frictional force to wheels 216 via controller 250 as part of an automated engine stopping procedure.

In response to a request to increase a speed of vehicle 225, vehicle system controller may obtain a driver demand power or power request from a propulsive effort pedal or other device. Vehicle system controller 255 then allocates a fraction of the requested driver demand power to the engine and the remaining fraction to the ISG or BISG. Vehicle system controller 255 requests the engine power from engine controller 12 and the ISG power from electric machine controller 252. If the ISG power plus the engine power is less than a transmission input power limit (e.g., a threshold value not to be exceeded), the power is delivered to torque converter 206 which then relays at least a fraction of the requested power to transmission input shaft 270. Transmission controller 254 selectively locks torque converter clutch 212 and engages gears via gear clutches 211 in response to shift schedules and TCC lockup schedules that may be based on input shaft power and vehicle speed. In some conditions when it may be desired to charge electric energy storage device 262, a charging power (e.g., a negative ISG power) may be requested while a non-zero driver demand power is present. Vehicle system controller 255 may request increased engine power to overcome the charging power to meet the driver demand power.

In response to a request to reduce speed of vehicle 225 and provide regenerative braking, vehicle system controller may provide a negative desired wheel power (e.g., desired or requested powertrain wheel power) based on vehicle speed and brake pedal position. Vehicle system controller 255 then allocates a fraction of the negative desired wheel power to the ISG 240 and the engine 10. Vehicle system controller may also allocate a portion of the requested braking power to friction brakes 218 (e.g., desired friction brake wheel power). Further, vehicle system controller may notify transmission controller 254 that the vehicle is in regenerative braking mode so that transmission controller 254 shifts gears 211 based on a unique shifting schedule to increase regeneration efficiency. Engine 10 and ISG 240 may supply a negative power to transmission input shaft 270, but negative power provided by ISG 240 and engine 10 may be limited by transmission controller 254 which outputs a transmission input shaft negative power limit (e.g., not to be exceeded threshold value). Further, negative power of ISG 240 may be limited (e.g., constrained to less than a threshold negative threshold power) based on operating conditions of electric energy storage device 262, by vehicle system controller 255, or electric machine controller 252. Any portion of desired negative wheel power that may not be provided by ISG 240 because of transmission or ISG limits may be allocated to engine 10 and/or friction brakes 218 so that the desired wheel power is provided by a combination of negative power (e.g., power absorbed) via friction brakes 218, engine 10, and ISG 240.

Accordingly, power control of the various powertrain components may be supervised by vehicle system controller 255 with local power control for the engine 10, transmission 208, electric machine 240, and brakes 218 provided via engine controller 12, electric machine controller 252, transmission controller 254, and brake controller 250.

As one example, an engine power output may be controlled by adjusting a combination of spark timing, fuel pulse width, fuel pulse timing, and/or air charge, by controlling throttle opening and/or valve timing, valve lift and boost for turbo- or super-charged engines. In the case of a diesel engine, controller 12 may control the engine power output by controlling a combination of fuel pulse width, fuel pulse timing, and air charge. Engine braking power or negative engine power may be provided by rotating the engine with the engine generating power that is insufficient to rotate the engine. Thus, the engine may generate a braking power via operating at a low power while combusting fuel, with one or more cylinders deactivated (e.g., not combusting fuel), or with all cylinders deactivated and while rotating the engine. The amount of engine braking power may be adjusted via adjusting engine valve timing. Engine valve timing may be adjusted to increase or decrease engine compression work. Further, engine valve timing may be adjusted to increase or decrease engine expansion work. In all cases, engine control may be performed on a cylinder-by-cylinder basis to control the engine power output.

Electric machine controller 252 may control power output and electrical energy production from ISG 240 by adjusting current flowing to and from field and/or armature windings of ISG as is known in the art.

Transmission controller 254 receives transmission input shaft position via position sensor 271. Transmission controller 254 may convert transmission input shaft position into input shaft speed via differentiating a signal from position sensor 271 or counting a number of known angular distance pulses over a predetermined time interval. Transmission controller 254 may receive transmission output shaft torque from torque sensor 272. Alternatively, sensor 272 may be a position sensor or torque and position sensors. If sensor 272 is a position sensor, controller 254 may count shaft position pulses over a predetermined time interval to determine transmission output shaft velocity. Transmission controller 254 may also differentiate transmission output shaft velocity to determine transmission output shaft rate of speed change. Transmission controller 254, engine controller 12, and vehicle system controller 255, may also receive addition transmission information and/or supply control signals to sensors and actuators 277, which may include but are not limited to pump output line pressure sensors, transmission hydraulic pressure sensors (e.g., gear clutch fluid pressure sensors), disconnect clutch pressure regulation valves, transmission line pressure regulation valves, ISG temperature sensors, and BISG temperatures, gear shift lever sensors, and ambient temperature sensors. Transmission controller 254 may also receive requested gear input from gear shift selector 290 (e.g., a human/machine interface device). Gear shift selector 290 may include positions for gears 1-N (where N is an upper gear number), D (drive), and P (park).

Brake controller 250 receives wheel speed information via wheel speed sensor 221 and braking requests from vehicle system controller 255. Brake controller 250 may also receive brake pedal position information from brake pedal sensor 154 shown in FIG. 1 directly or over CAN 299. Brake controller 250 may provide braking responsive to a wheel power command from vehicle system controller 255. Brake controller 250 may also provide anti-lock and vehicle stability braking to improve vehicle braking and stability. As such, brake controller 250 may provide a wheel power limit (e.g., a threshold negative wheel power not to be exceeded) to the vehicle system controller 255 so that negative ISG power does not cause the wheel power limit to be exceeded. For example, if controller 250 issues a negative wheel power limit of 50 N-m, ISG power is adjusted to provide less than 50 N-m (e.g., 49 N-m) of negative power at the wheels, including accounting for transmission gearing.

Thus, the system of FIGS. 1 and 2 provides for a system, comprising: an electric machine; an internal combustion engine; a driveline disconnect clutch to selectively couple the electric machine to the internal combustion engine; and a controller including executable instructions stored in non-transitory memory that cause the controller to not adjust torque of the electric machine when the electric machine achieves a speed above a first requested speed in response to a request to start the internal combustion engine. The system further comprises additional instructions that cause the controller to adjust torque of the electric machine when a speed of the electric machine is less than the first requested speed. The system further comprises additional instructions to close the driveline disconnect clutch in response to the request to start the internal combustion engine. The system further comprises additional instructions to reduce a speed of the electric machine to a second requested speed in response to a line pressure of a transmission reaching a threshold pressure and a speed of the internal combustion engine increasing. The system further comprises additional instructions to increase speed of the internal combustion engine and speed of the electric machine via producing torque via the engine after reducing the speed of the electric machine to the second requested speed. The system further comprises additional instructions to operate the electric machine in a torque control mode in response to the speed of the internal combustion engine exceeding a threshold. The system further comprises additional instructions to reduce a speed of the electric machine to a second requested speed in response to a line pressure of a transmission reaching a threshold pressure and a speed of the electric machine exceeding a threshold.

Figure 3:
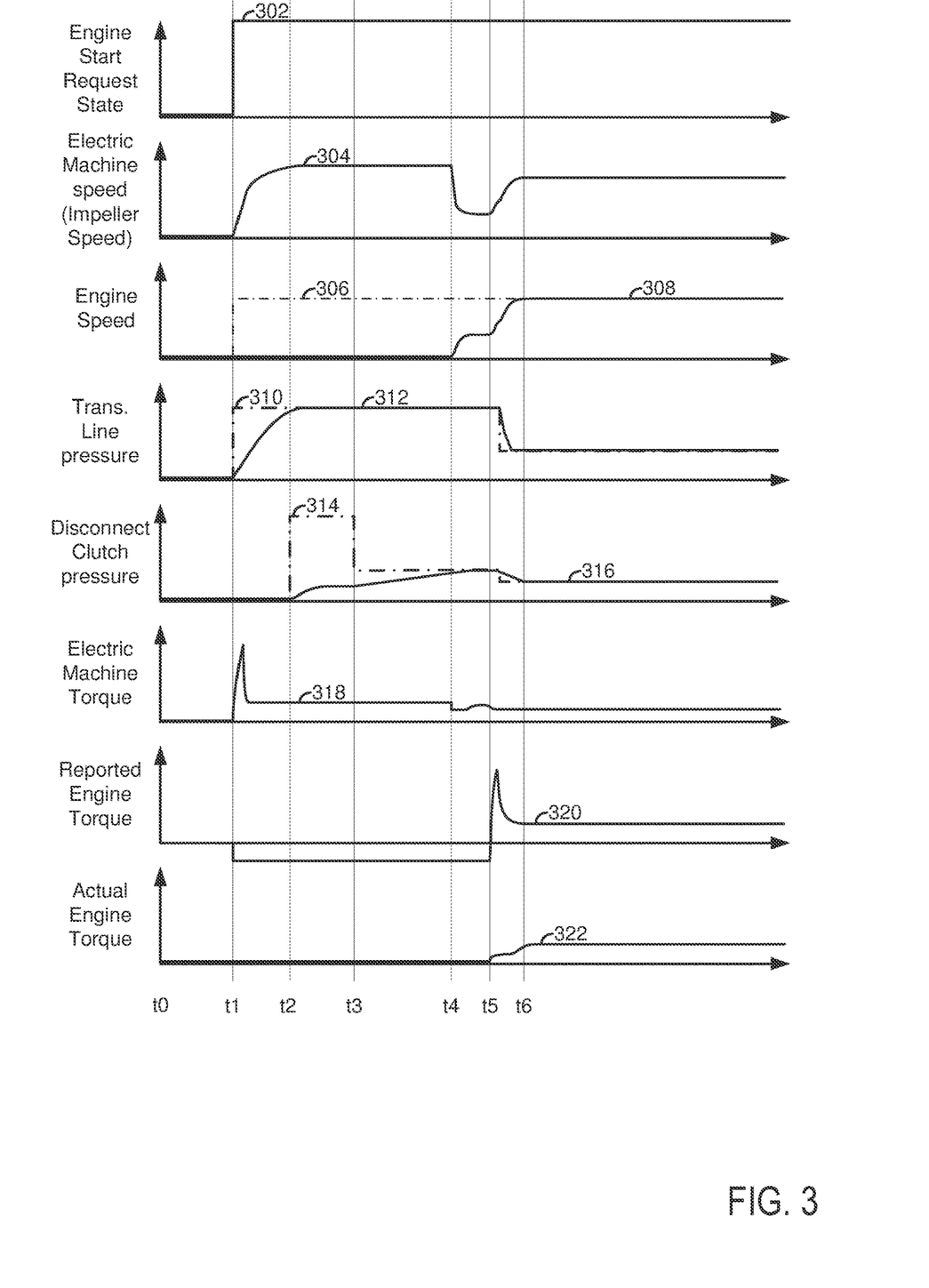
FIG. 3 shows an example engine starting sequence according to the method of FIGS. 4 and 5.
Figure 4:
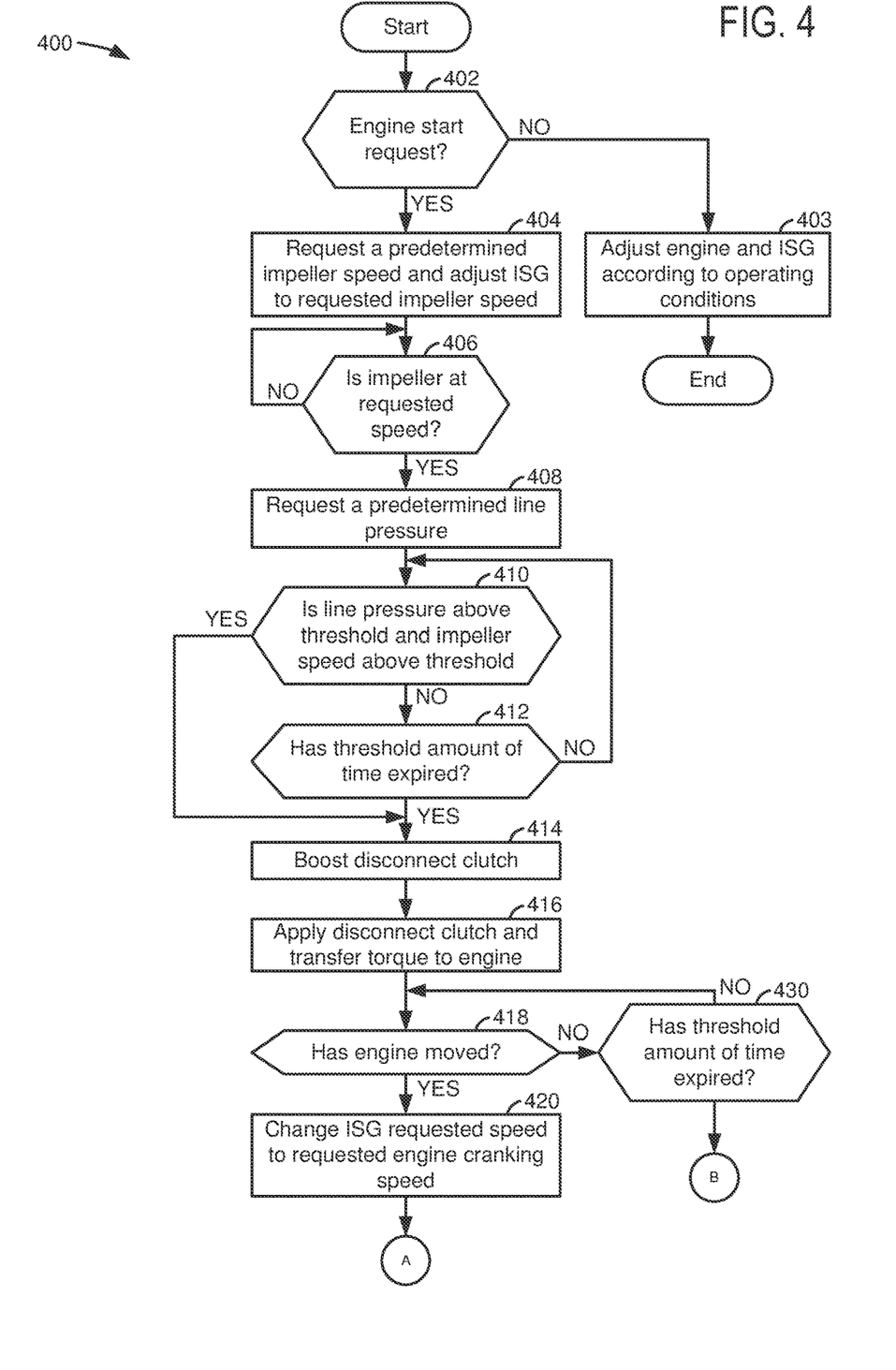
FIGS. 4 and 5 show a flow chart of a method for starting an engine.
Figure 5:
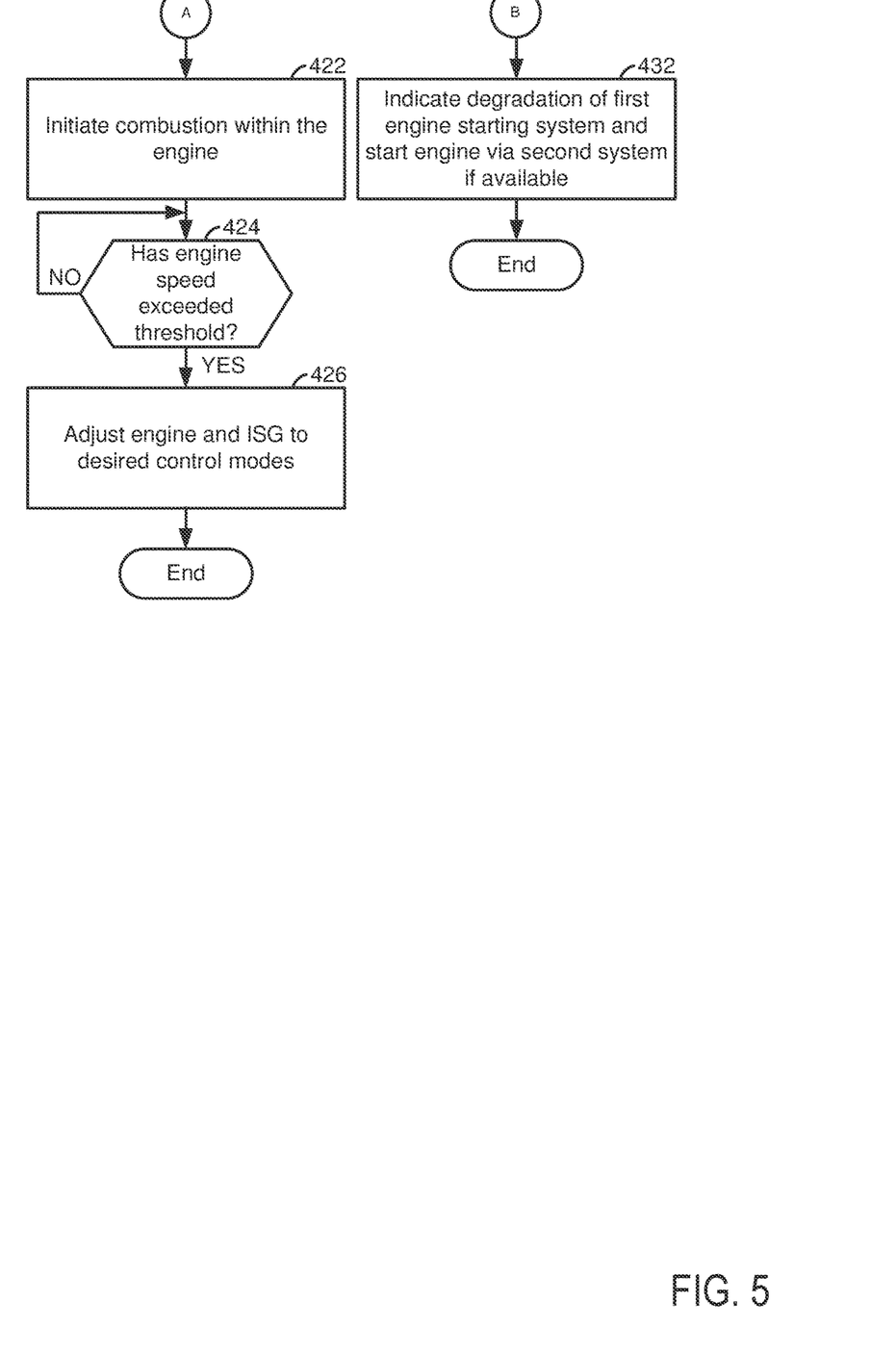

Referring now to FIG. 3, plots of an example prophetic engine starting sequence according to the method of FIGS. 4 and 5 is shown. The example sequence may be provided by the system of FIGS. 1 and 2 in cooperation with the method of FIGS. 4 and 5. The plots are aligned in time and occur at a same time. The vertical lines at t0-t6 indicate times of particular interest in the sequence.

The first plot from the top of FIG. 3 is a plot of an engine start request state versus time. The vertical axis represents engine start request state and an engine start is being requested when trace 302 is at a level that is near the vertical axis arrow. An engine start is not being requested when trace 302 is near the horizontal axis. The horizontal axis represents time and the time increases from the left side of the figure to the right side of the figure. Trace 302 represents the engine start request state.

The second plot from the top of FIG. 3 is a plot of electric machine rotational speed versus time. The vertical axis represents electric machine rotational speed and rotation speed increases in the direction of the vertical axis arrow. The horizontal axis represents time and the time increases from the left side of the figure to the right side of the figure. Trace 304 represents the electric machine's rotational speed.

The third plot from the top of FIG. 3 is a plot of engine rotational speed versus time. The vertical axis represents engine rotational speed and engine rotational speed increases in the direction of the vertical axis arrow. The horizontal axis represents time and the time increases from the left side of the figure to the right side of the figure. Trace 306 represents requested engine speed and trace 308 represents actual engine speed.

The fourth plot from the top of FIG. 3 is a plot of transmission fluid line pressure versus time. The vertical axis represents transmission line pressure and transmission line pressure increases in the direction of the vertical axis arrow. The horizontal axis represents time and the time increases from the left side of the figure to the right side of the figure. Trace 310 represents requested transmission line pressure and trace 312 represents actual transmission line pressure.

The fifth plot from the top of FIG. 3 is a plot of driveline disconnect clutch pressure (e.g., pressure of fluid in the driveline disconnect clutch) versus time. The vertical axis represents driveline disconnect clutch pressure and driveline disconnect clutch pressure increases in the direction of the vertical axis arrow. The horizontal axis represents time and the time increases from the left side of the figure to the right side of the figure. Trace 314 represents requested driveline disconnect clutch pressure and trace 316 represents actual driveline disconnect clutch pressure.

The sixth plot from the top of FIG. 3 is a plot of electric machine torque versus time. The vertical axis represents electric machine torque and electric machine torque increases in the direction of the vertical axis arrow. The horizontal axis represents time and the time increases from the left side of the figure to the right side of the figure. Trace 318 represents electric machine torque.

The seventh plot from the top of FIG. 3 is a plot of reported engine torque (e.g., torque as determined from engine operating conditions, such as engine speed and engine air flow) versus time. The vertical axis represents reported engine torque and reported engine torque increases in the direction of the vertical axis arrow. The horizontal axis represents time and the time increases from the left side of the figure to the right side of the figure. Trace 320 represents reported engine torque.

The eighth plot from the top of FIG. 3 is a plot of actual engine torque versus time. The vertical axis represents actual engine torque and actual engine torque increases in the direction of the vertical axis arrow. The horizontal axis represents time and the time increases from the left side of the figure to the right side of the figure. Trace 322 represents actual engine torque.

At time t0, the engine is not rotating and the engine start request is not asserted as indicated by the engine start request state. The requested engine speed is zero and the requested transmission line pressure is zero. The electric machine is not rotating and the transmission line pressure is zero. The requested driveline disconnect clutch pressure is zero and the driveline disconnect clutch pressure is also zero. The electric machine torque is zero. The reported engine torque is zero and the actual engine torque is zero.

At time t1, an engine start is requested. The electric machine rotational speed begins to increase in response to the engine start request while engine rotational speed remains zero. The requested engine speed is increased to a threshold level and the requested transmission line pressure is increased to a threshold level. The transmission line pressure begins to increase. The requested driveline disconnect clutch pressure remains zero and the driveline disconnect clutch pressure is zero. Electric machine torque increases quickly to increase electric machine speed to a first speed that is greater than the requested engine speed. The first speed may be a function of transmission pump fluid flow rate. The reported engine torque is negative since the engine is not combusting fuel and external torque is needed to rotate the engine. The actual engine torque is zero.

At time t2, speed of the electric machine, which is equivalent to torque converter turbine speed, reaches the first speed and transmission line pressure exceeds a threshold pressure (not shown) that is required to boost disconnect clutch pressure. Therefore, the requested disconnect clutch pressure is increased, which causes the disconnect clutch pressure to begin to increase. The requested disconnect clutch pressure may cause a pressure control valve that supplies fluid to the driveline disconnect clutch to be adjusted. The engine start remains asserted and the requested engine speed remains unchanged. The engine speed remains zero since the driveline disconnect clutch has not begun to transfer torque from the electric machine to the engine. The requested transmission line pressure remains unchanged and the transmission line pressure approaches the requested transmission line pressure. The electric machine torque has stabilized at a level that rotates the electric machine at a first speed. The reported engine torque remains negative and the engine torque remains zero.

At time t3, boosting of the driveline disconnect clutch pressure is complete so the requested driveline disconnect clutch pressure is reduced. The engine start request remains asserted and the electric machine speed is equal to the first speed that is requested of the electric machine. The engine speed is zero since insufficient torque is transferred from the electric machine to rotate the engine. The requested engine speed remains unchanged. The requested transmission line pressure and the transmission line pressure are equal. The driveline disconnect clutch pressure continues to increase and the electric machine torque is unchanged. The reported engine torque and the engine torque are unchanged.

At time t4, the engine begins to rotate as indicated by the increasing engine speed. The electric machine speed is reduced toward a second requested electric machine speed (not shown) in response to the engine beginning to move. The requested transmission line pressure and the transmission line pressure remain at higher levels. The requested driveline disconnect clutch pressure is unchanged and the driveline disconnect clutch pressure continues to increase. The electric machine torque is reduced to lower the electric machine speed. The reported engine torque and the engine torque remain unchanged.

Between time t4 and time t5, the engine start request remains asserted and the electric machine speed is reduced to the second requested electric machine speed. The engine speed increases and it reaches an engine cranking speed, which is the second requested electric machine speed. The requested transmission line pressure and the transmission line pressure are equal to each other. The driveline disconnect clutch pressure is equal to the requested driveline disconnect clutch pressure. The electric machine torque is increased to maintain the electric machine speed at the second requested electric machine speed. The reported engine torque and the actual engine torque are unchanged.

At time t5, the engine starts combusting fuel and the reported engine torque increases. The actual engine torque also increases, but its increase is much less than the reported engine torque. As such, the reported engine torque may be unreliable at this time. The engine start request remains asserted and the electric machine speed begins to increase as the torque that is generated by the engine increases the engine speed and the electric machine speed. The requested transmission line pressure and the transmission line pressure remain at higher levels. The requested driveline disconnect clutch pressure and the driveline disconnect clutch pressure are equal to each other.

Between time t5 and time t6, the engine start request remains asserted and the engine speed increases as the engine generates torque via combustion. The requested transmission line pressure and transmission line pressure are reduced as engine speed increases. The requested driveline disconnect clutch pressure is reduced and the driveline disconnect clutch pressure is reduced. The electric machine torque is constant. The reported engine torque reaches a peak value and then it decreases as the reported engine torque improves in accuracy. The actual engine torque gradually increases as the engine combusts fuel.

At time t6, the engine speed has reached the requested engine speed via torque that is produced through combustion. The engine start request remains asserted and the electric machine speed is equal to the engine speed since the driveline disconnect clutch is closed (not shown). The requested transmission line pressure and the transmission line pressure are at a reduced level. The requested driveline disconnect clutch pressure and driveline disconnect clutch pressure are at a reduced level where the driveline disconnect clutch remains fully closed. The electric machine torque is unchanged. The reported engine torque is leveled off and the actual engine torque is equal to the reported engine torque.

In this way, speed of the engine and the ISG may be controlled during an engine start so that engine speed control may be consistent from engine start to engine start. Further, speed control of the ISG does not interfere with engine run-up.

Referring now to FIGS. 4 and 5, a flow chart of a method for starting an engine of a hybrid vehicle is shown. The method of FIGS. 4 and 5 may be incorporated into and may cooperate with the system of FIGS. 1-2. Further, at least portions of the method of FIGS. 4 and 5 may be incorporated as executable instructions stored in non-transitory memory while other portions of the method may be performed via a controller transforming operating states of devices and actuators in the physical world.

At 402, method 400 judges if an engine start is requested. Method 400 may judge that an engine start is requested when a human or automatic driver requests that the vehicle's engine is started. A human may request an engine start via a human/machine interface. A controller, such as an automatic driver, may request an engine start via a request from one controller to a second controller. If method 400 judges that an engine start is requested, the answer is yes and method 400 proceeds to 404. Otherwise, the answer is no and method 400 proceeds to 403.

At 403, method 400 adjusts engine operation and ISG operation according to vehicle operating conditions. For example, method 400 may request torque from the engine and ISG that meets a driver demand torque as requested via a propulsive effort pedal. In addition, the ISG may assist the engine to generate a requested torque, or alternatively, the ISG may convert power generated by the engine into charge that is stored in an electric energy storage device. Method 400 proceeds to exit.

At 404, method 400 requests that the ISG rotational speed is controlled to a first speed. The first speed may be a speed at which a transmission fluid pump produces a desired or request flow rate of transmission fluid. The ISG may be operated in a speed control mode via the speed controller that is described in FIGS. 6 and 7. While operating in the speed control mode, rotational speed of the ISG may follow or be commanded to follow a requested or desired speed while ISG torque is varied so that the ISG may rotate at the requested or desired speed. The requested or desired speed may be the previously mentioned first speed. Method 400 proceeds to 406.

At 406, method 400 judges if the torque converter impeller is rotating at a requested speed. In one example, the requested speed is the previously mentioned first requested speed. The ISG may be directly coupled to the torque converter so that the transmission pump rotates at a same or fractional speed of ISG speed. If method 400 judges that the torque converter impeller is rotating at the requested speed, or within a threshold speed of the requested speed, the answer is yes and method 400 proceeds to 408. Otherwise, the answer is no and method 400 returns to 406.

At 408, method 400 requests a predetermined line pressure. In one example, the line pressure is a pressure at the output of the transmission fluid pump. The predetermined pressure may be a pressure that is sufficient to fully close and lock the driveline disconnect clutch. Method 400 proceeds to 410.

At 410, method 400 judge if the transmission line pressure is above a threshold pressure (e.g., the requested transmission line pressure) and if torque converter impeller speed is greater than the requested torque converter impeller speed. The torque converter line pressure may be determined via a pressure sensor and the torque converter impeller speed may be determined via a speed or position sensor. If method 400 judges that the transmission line pressure is above the threshold pressure and that torque converter impeller speed is greater than the requested torque converter impeller speed, the answer is yes and method 400 proceeds to 414. Otherwise, the answer is no and method 400 proceeds to 412.

At 412, method 400 judges if a threshold amount of time has passed since the transmission line pressure has been most recently requested at 408. If so, the answer is yes and method 400 proceeds to 414. Otherwise, the answer is no and method 400 returns to 410. In one example, the threshold amount of time may be an amount of time that may be expected to increase the transmission line pressure from zero to the requested transmission line pressure. Assessing the amount of time against the threshold amount of time may allow the system to continue to operate as expected if output of a pressure sensor degrades.

At 414, method 400 requests a boost pressure to be applied to the driveline disconnect clutch. The boost pressure may be a pressure that exceeds a pressure to close the driveline disconnect clutch. The boost pressure may allow the driveline disconnect clutch to close the driveline disconnect clutch sooner than if driveline disconnect clutch pressure is only sufficient to transfer torque generated by the ISG. Method 400 proceeds to 416.

At 416, method 400 closes the driveline disconnect clutch and begins to transfer torque from the ISG to the engine. In particular, the fluid pressure that is applied to the driveline disconnect clutch is gradually increased so that the clutch may not grab and cause a large driveline torque disturbance. Method 400 proceeds to 418.

At 418, method 400 judges if the engine has moved since the driveline disconnect clutch has begun to close most recently. If so, the answer is yes and method 400 proceeds to 420. If not, the answer is no and method 400 proceeds to 430.

At 430, method 400 judges if a threshold amount of time has passed since the driveline disconnect clutch has begun to close. If so, the answer is yes and method 400 proceeds to 432. Otherwise, the answer is no and method 400 returns to 418.

At 432, method 400 indicates degradation of the engine starting system that includes the ISG and the driveline disconnect clutch. The degradation may include the driveline disconnect clutch not closing in an expected way, the ISG not rotating as expected, insufficient torque to rotate the engine, and other conditions. In addition, method 400 may start the engine via a second engine starting system. For example, the engine may be started via a 12 volt starter motor at 432 if such a secondary starting system is available. Method 400 proceeds to exit.

At 420, method 400 adjusts the requested ISG speed to a desired or requested engine cranking speed (e.g., a speed that the engine is rotated before initiating combustion in the engine, such as 200 RPM). The ISG remains in speed control mode. The engine cranking speed may be well below engine idle speed so that noise and vibrations of rotating the engine may be reduced. The requested ISG speed at 420 is a second speed that is requested of the ISG during the engine starting process and the second requested speed may be lower than the first requested speed. Method 400 proceeds to 422.

At 422, method 400 initiates combustion within the engine. In particular, method 400 activates fuel injectors and the engine's ignition system while the engine is being rotated at the requested engine cranking speed. If the engine is a diesel engine, method 400 may simply activate the engine's fuel injectors. Method 400 proceeds to 424.

At 424, method 400 judges if engine speed has exceeded a threshold speed (e.g., 400 RPM). If so, the answer is yes and method 400 proceeds to 426. Otherwise, the answer is no and method 400 returns to 424.

At 426, method 400 operates the engine and the ISG in desired or requested modes according to vehicle operating conditions. For example, if the vehicle's transmission is engaged in a gear and the propulsive effort pedal is applied, the engine and the ISG may be operated in a torque control mode to provide a torque that may be requested via the vehicle operator applying the propulsive effort pedal. The ISG torque follows or is commanded to a requested torque while ISG speed is allowed to vary when the ISG is operated in the torque control mode. Engine torque is controlled in a similar way when the engine is operated in a torque control mode. The engine may operate in a speed control mode and the ISG may operate in a torque control mode if the vehicle's transmission is engaged in park or neutral. Method 400 proceeds to exit.

In this way, engine starting may be controlled so that multiple speed control systems do not compete against each other during engine starting. Further, closing of the driveline disconnect clutch and adjusting ISG speed may be a function of changes in engine and/or vehicle operating conditions. For example, ISG speed may be reduced to a second requested speed after the engine begins to move so that the ISG's kinetic energy may be used to rotate the engine. However, after the engine speed begins to increase, the ISG speed may be reduced to lower noise vibration and harshness that may be generated when the engine is being cranked.

Referring now to FIG. 6, an example speed controller for regulating ISG speed is shown. The speed controller of FIG. 6 may operate in cooperation with the method of FIGS. 4 and 5 to control ISG and engine speed during engine starting. The method of FIG. 6 may be incorporated into and may cooperate with the system of FIGS. 1-2. Further, at least portions of the method of FIG. 6 may be incorporated as executable instructions stored in non-transitory memory while other portions of the method may be performed via a controller transforming operating states of devices and actuators in the physical world.

At 602, method 600 determines a requested rotational speed of the ISG, present ISG rotational speed, and use type for the speed controller (e.g., engine starting or non-engine starting). In one example, method 600 selects the use of the speed controller based on present vehicle operating conditions including whether or not there is a request to start the engine. Method determines a rotational speed of the ISG based on the use of the controller. If the controller is to be used for starting the engine, method 600 retrieves a requested ISG speed from controller memory that is based on a speed that a transmission pump generates a predetermined flow rate. If the ISG is not being used for starting the engine, the ISG speed may be adjusted to a speed that moves the vehicle at a predetermined speed (e.g., creep speed) or that moves the vehicle at a speed requested via a cruise control system, for example. Method 600 determines the ISG rotational speed via a speed or position sensor. Method 600 proceeds to 604.

At 604, method 600 judges if the speed controller is being applied for engine starting speed control (e.g., controlling the engine's rotational speed during engine starting). If so, the answer is yes and method 600 proceeds to 606. Otherwise, the answer is no and method 600 proceeds to 605.

At 606, method 600 retrieves engine starting speed controller gain values. The engine starting speed controller gain values may be stored in controller memory and the values may be similar to the values and trends shown in the engine starting speed control gain tables 700 shown in FIG. 7. In particular, the gain values may be such that engine starting speed control gain values are zero when ISG speed error is zero or negative as shown in tables 700 of FIG. 7. The gain values of zero when ISG speed error is zero or negative cause ISG feedback based torque adjustments to be zero. Consequently, as ISG speed approaches the requested ISG speed, the ISG torque correction adjustments go to zero. Further, if ISG speed goes above the requested ISG speed, the ISG torque correction adjustments are zero. By making ISG torque corrections zero near and above the requested ISG speed, the ISG may be prevented from counteracting engine torque that accelerates the engine above the requested ISG speed. However, feedback ISG torque adjustments may cause ISG torque to increase if ISG speed falls below or is below the requested ISG speed. This allows the engine to increase speed of the ISG and the engine when combustion torque is sufficient to do so without the ISG fighting against the engine when the engine speed increases above the requested ISG speed. This may be desirable so that the engine may be kept at cranking speed, yet the engine speed may be allowed to increase under similar conditions as a conventional 12 volt starter. Method 600 applies the engine starting speed control gains to the speed controller and proceeds to 608.

At 605, method 600 retrieves non-engine starting speed controller gain values or general speed controller gain values. The non-engine starting speed controller gain values may be stored in controller memory and the values may be similar to the values and trends shown in the engine starting speed control gain tables 740 shown in FIG. 7. In particular, the gain values may be such that speed control gain values are non-zero when ISG speed error is negative as shown in tables 740 of FIG. 7. The gain values of zero when ISG speed error is negative cause ISG feedback based torque adjustments to be non-zero. Consequently, as ISG speed veers away from the requested ISG speed, the ISG torque correction adjustments increase. This allows the speed controller to track a requested speed. Method 600 applies the non-engine starting speed control gains to the speed controller and proceeds to 608.

At 608, method 600 determines speed controller error values. In one example, method 600 determines the errors via the following equations:

$$Spderr = reqspd - curspd$$
$$Spdrterr = \frac{(Spderr - Spderrold)}{\Delta T}$$
$$Spderrold = Spderr$$

where Spderr is the speed error of the device that is operating in speed control mode (e.g., ISG 240 in FIG. 2), reqspd is the requested speed of the device that is operating in speed control mode, curspd is the current speed of the device that is operating in the speed control mode, Spdrterr is the speed error rate of the device that is operating in the speed control mode, Spderrold is a value of a most recent prior speed error of the device that is operating in speed control mode, and ΔT is the time interval between speed measurements of the device that is operating in speed control mode. Method 600 proceeds to 610.

At 610, method 600 determines proportional/integral/derivative (PID) component values. In one example, method 600 determines the PID component values via the following equations:

Proval=Spderr·Ptable(Spderr,curspd)

Intval=Spderr·Itable(Spderr,curspd)+Intvalold

Intvalold=Intval

Divval=Spdrterr·Dtable(Spderr,curspd)

where Proval is the proportional component value, Ptable is a look-up table reference to proportional gain values, Intval is the integral component value, Iiable is a look-up table reference to integral gain values, Intvalold is a most recent prior value of Intval, Divval is the derivative component value, and Dtable is a look-up table reference to derivative gain values. Method 600 proceeds to 612.

At 612, method 600 limits the PID component values. For example, the PID values may be held below threshold values. For example, Proval may be held to values less than or equal to 10. Method 600 may limit the PID component values via the following equations:

$$P\text{vallim} = P\text{lim}(P\text{roval})$$

$$I\text{vallim} = I\text{lim}(I\text{ntval})$$

$$D\text{ivlim} = D\text{lim}(D\text{ivval})$$

where Pvallim is a limited version of Proval, Plim is a function that limits values of Proval, Ivallim is a limited version of Intval, Ilim is a function that limits values of Intval, Divlim is a limited version of Divval, and Dlim is a function that limits values of Divval. Method 600 proceeds to 614.

At 614, method 600 determines the speed control adjustment and commands the device in speed control mode (e.g., ISG 240 of FIG. 2) according to the speed control adjustments. In one example, method 600 determines the speed control adjustment via the following equation:

$$\text{Spdadj} = P\text{vallim} + I\text{vallim} + D\text{ivlim}$$

where Spdadj is the speed adjustment command for the device that is being operated in speed control mode. Method 600 proceeds to exit.

Thus, the method of FIGS. 4-6 provides for a method for starting an engine, comprising: operating an electric machine in a speed control mode to achieve a first requested speed in response to a request to start an engine; closing a driveline disconnect clutch to couple the engine to the electric machine in response to the request to start the engine; and reducing a speed of the electric machine to a second requested speed in response to a line pressure of a transmission reaching a threshold pressure and a speed of the engine increasing. The method includes where the engine start is a cold engine start. The method further comprises not increasing torque output of the electric machine to increase engine speed and electric machine speed above the second requested speed after reducing electric machine speed to the second requested speed and before the engine is started. The method further comprises increasing speed of the engine and speed of the electric machine via producing torque via the engine after reducing the speed of the electric machine to the second requested speed.

In some examples, the method further comprises operating the electric machine in a torque control mode in response to engine speed exceeding a threshold speed. The method includes where the first requested speed is a speed at which output of a transmission pump exceeds a threshold level. The method includes where the second requested speed is a requested engine cranking speed. The method includes where a rotational speed of the engine is zero before the driveline disconnect clutch is closed.

In addition, the method of FIGS. 4-6 provides for a method for starting an engine, comprising: operating an electric machine in a speed control mode to achieve a first requested speed in response to a request to start an engine; closing a driveline disconnect clutch to couple the engine to the electric machine in response to the request to start the engine; and reducing a speed of the electric machine to a second requested speed in response to a line pressure of a transmission reaching a first threshold pressure and a speed of the electric machine exceeding a second threshold. The method further comprises increasing a requested driveline disconnect clutch pressure in response to the line pressure of the transmission reaching the threshold pressure and a speed of the electric machine exceeding the second threshold. The method further comprises operating the electric machine in a torque control mode in response to engine speed exceeding a third threshold. The method further comprises operating the electric machine in the speed control mode with a first group of control parameters during starting of the engine. The method further comprises operating the electric machine in the speed control mode with a second group of control parameters when not starting the engine.

Referring now to FIG. 7, tables that include example PID gain values are shown. Engine starting speed control gain tables 700 include a table for proportional gain values (EngineStart P_table), a table for integral gain values (EngineStart I_table), and a table for derivative gain values (EngineStart D_table). Each of the tables may be referenced via speed error of the device that is being operated in speed control mode and the current speed of the device that is being operated in the speed control mode. In particular, table columns are indexed via the current speed of the device that is being operated in speed control mode and table rows are indexed via speed error of the device that is being operated in speed control mode.

The engine starting table for proportional gain values includes a first row 704 and a first column 702. It also includes a fifth row 705 and a seventh column 703. Additional, columns and rows are included between these rows and columns. Values in cells of the respective columns and rows are proportional gain values. For example, the proportional gain value at row three, column three is 10 as indicated at 720. The table for proportional gain values includes a normalizer column 722 and a normalizer row 724. In this example, the normalizer column 722 indicates which values of speed error reference row values in the proportional gain table. Normalizer row 724 indicates which value of current speed reference column values in the proportional gain table. The normalizer row 724 includes two values of zero. This allows negative speed error values to reference the first row, which contains proportional gain values that are equal to zero. These values cause the speed controller to provide no proportional adjustment to correct when the device that is operating in speed control mode exceeds the requested speed. The tables for integral gain values (EngineStart I_table) and the table for derivative gain values (EngineStart D_table) are constructed in a similar way. In particular, the table for integral gain values includes a first row 708 and a first column 706. It also includes a fifth row 709 and a seventh column 707. The table for derivative gain values includes a first row 712 and a first column 710. It also includes a fifth row 713 and a seventh column 711.

Non-engine starting speed control gain tables 740 or standard tables include a table for proportional gain values (Standard P_table), a table for integral gain values (Standard I_table), and a table for derivative gain values (Standard D_table). Each of the tables may be referenced via speed error of the device that is being operated in speed control mode and the current speed of the device that is being operated in the speed control mode. In particular, table columns are indexed via the current speed of the device that is being operated in speed control mode and table rows are indexed via speed error of the device that is being operated in speed control mode.

The standard table for proportional gain values includes a first row 752 and a first column 7050. It also includes a fifth row 753 and a seventh column 751. Additional, columns and rows are included between these rows and columns. Values in cells of the respective columns and rows are proportional gain values. The normalizer rows in each of the standard tables includes only one value of zero. These tables provide gain values for positive and negative speed error values. The standard tables for integral gain values (Standard I_table) and the table for derivative gain values (Standard D_table) are constructed in a similar way. In particular, the standard table for integral gain values includes a first row 756 and a first column 754. It also includes a fifth row 757 and a seventh column 755. The standard table for derivative gain values includes a first row 760 and a first column 758. It also includes a fifth row 761 and a seventh column 759.

Thus, different sets of speed controller gains may be provided for engine starting and non-engine starting conditions for controlling ISG speed. The engine starting gains may be constructed to not provide an adjustment to ISG speed via adjusting ISG torque when ISG speed is greater than a requested ISG speed. Therefore, if the engine increases the speed of the ISG via generating torque through combustion, the ISG speed command is not adjusted to compensate for the speed increase that is due to the engine torque. Consequently, control of the ISG may not interfere with engine run-up to idle speed.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, at least a portion of the described actions, operations and/or functions may graphically represent code to be programmed into non-transitory memory of the computer readable storage medium in the control system. The control actions may also transform the operating state of one or more sensors or actuators in the physical world when the described actions are carried out by executing the instructions in a system including the various engine hardware components in combination with one or more controllers.

This concludes the description. The reading of it by those skilled in the art would bring to mind many alterations and modifications without departing from the spirit and the scope of the description. For example, single cylinder, I3, I4, I5, V6, V8, V10, and V12 engines operating in natural gas, gasoline, diesel, or alternative fuel configurations could use the present description to advantage.

The invention claimed is:

1. A method for starting an engine, comprising:
   operating an electric machine in a speed control mode to achieve a first requested speed in response to a request to start an engine;
   closing a driveline disconnect clutch to couple the engine to the electric machine in response to the request to start the engine; and
   reducing a speed of the electric machine to a second requested speed in response to a line pressure of a transmission reaching a threshold pressure and a speed of the engine increasing.

2. The method of claim 1, where the engine start is a cold engine start.

3. The method of claim 1, further comprising not increasing torque output of the electric machine to increase engine speed and electric machine speed above the second requested speed after reducing electric machine speed to the second requested speed and before the engine is started.

4. The method of claim 1, further comprising increasing speed of the engine and speed of the electric machine via producing torque via the engine after reducing the speed of the electric machine to the second requested speed.

5. The method of claim 4, further comprising operating the electric machine in a torque control mode in response to engine speed exceeding a threshold speed.

6. The method of claim 1, where the first requested speed is a speed at which output of a transmission pump exceeds a threshold level.

7. The method of claim 1, where the second requested speed is a requested engine cranking speed.

8. The method of claim 1, where a rotational speed of the engine is zero before the driveline disconnect clutch is closed.

9. A system, comprising:
   an electric machine;
   an internal combustion engine;
   a driveline disconnect clutch to selectively couple the electric machine to the internal combustion engine; and
   a controller including executable instructions stored in non-transitory memory that cause the controller to not adjust torque of the electric machine when the electric machine achieves a speed above a first requested speed in response to a request to start the internal combustion engine.

10. The system of claim 9, further comprising additional instructions that cause the controller to adjust torque of the electric machine when a speed of the electric machine is less than the first requested speed.

11. The system of claim 9, further comprising additional instructions to close the driveline disconnect clutch in response to the request to start the internal combustion engine.

12. The system of claim 11, further comprising additional instructions to reduce a speed of the electric machine to a second requested speed in response to a line pressure of a transmission reaching a threshold pressure and a speed of the internal combustion engine increasing.

13. The system of claim 12, further comprising additional instructions to increase speed of the internal combustion engine and speed of the electric machine via producing torque via the engine after reducing the speed of the electric machine to the second requested speed.

14. The system of claim 13, further comprising additional instructions to operate the electric machine in a torque control mode in response to the speed of the internal combustion engine exceeding a threshold.

15. The system of claim 9, further comprising additional instructions to reduce a speed of the electric machine to a second requested speed in response to a line pressure of a transmission reaching a threshold pressure and a speed of the electric machine exceeding a threshold.

16. A method for starting an engine, comprising:
operating an electric machine in a speed control mode to achieve a first requested speed in response to a request to start an engine;
closing a driveline disconnect clutch to couple the engine to the electric machine in response to the request to start the engine; and
reducing a speed of the electric machine to a second requested speed in response to a line pressure of a transmission reaching a first threshold pressure and a speed of the electric machine exceeding a second threshold.

17. The method of claim 16, further comprising increasing a requested driveline disconnect clutch pressure in response to the line pressure of the transmission reaching the threshold pressure and a speed of the electric machine exceeding the second threshold.

18. The method of claim 17, further comprising operating the electric machine in a torque control mode in response to engine speed exceeding a third threshold.

19. The method of claim 16, further comprising operating the electric machine in the speed control mode with a first group of control parameters during starting of the engine.

20. The method of claim 19, further comprising operating the electric machine in the speed control mode with a second group of control parameters when not starting the engine.

* * * * *